3,007,788
CONTROL OF AQUATIC PLANTS
Melvin Jay Josephs, Midland, Mich., assignor to The Dow Chemical Company, Midland, Mich., a corporation of Delaware
No Drawing. Filed June 6, 1957, Ser. No. 663,874
2 Claims. (Cl. 71—2.3)

This invention relates to herbicides and is particularly concerned with a composition and method for killing aquatic plants. The expression "aquatic plants" as herein employed refers to vegetative organisms normally growing in water and in which the leaf and stem parts are largely submersed. The expression is inclusive of water plants which are not rooted such as Ceratophyllum spp. (coontail), and rooted aquatic weeds such as Anacharis spp. (water weed), Vallisneria spp. (tape-grass), Potamogeton spp. (pond weed).

Aquatic plants growing out of place are commonly called weeds, and millions of dollars are expended annually for their control. In irrigation ditches, canals, rivers and streams of pleasure and commerce these plants hinder the flow of water and cause excessive sedimentation. Further such growth will result in high water loss from evaporation and interfere with navigation. Mechanical operations, such as dredging, chaining, burning and mowing are still the principal means of control. More recently efforts have been made at chemical control. The short-comings of the latter methods have included superficial burning of exposed leaves without the killing of the roots so as to permit the quick regrowth of the plants. Further, many of the proposed materials are as toxic to terrestrial plants as they are to aquatic plants so that the treated water is unsuited for irrigation of terrestrial crop plants. Also many of the chemicals are specific in their action and control only a few species, thus leading to increased growth activity on the part of unaffected plant.

It is an object of the present invention to provide a new and improved method for the control and suppression of the growth of aquatic plants. Another object is the provision of a method for the treatment of the water adjacent to aquatic plants in a pond or stream to control the growth of the plants. A further object is the provision of a method which will control the growth of a large variety of aquatic plant species. An additional object is the provision of novel compositions to be employed in the new methods for suppressing the growth of aquatic plants. Other objects will become apparent from the following specification and claims:

According to the present invention, it has been found that hexachlorocyclopentadiene is very toxic to aquatic plants when such compound or a composition in which it is employed, is introduced into water adjacent to the submersed portions of aquatic plants. Hexachlorocyclopentadiene is a crystalline solid soluble in many organic solvents and of very low solubility in water. The compound is readily and conveniently adapted to be distributed in water to control aquatic weeds. It is among the advantages of the present invention that the compound of the present invention accomplishes a quick kill of the stems and leaves of aquatic plants accompanied by the control in a short period of time of the roots. Another advantage of the compound of the present invention is its very low toxicity to terrestrial plants even in large dosages. A particular advantage of the present invention is the wide range of water temperatures over which the compound is effective. Thus the treatment can be carried out at almost any water temperature which will permit the growth and development of aquatic plants. A still further advantage of the methods and compositions of the present invention are their ability to control a wide variety of aquatic plants.

The distribution in water adjacent to growing aquatic plants of a dosage of the hexachlorocyclopentadiene compound effective to kill the plants is essential for the practice of the present invention. In general good results are obtained when the compound is distributed in water adjacent growing aquatic weeds in an amount of from about 15 to 400 parts or more by weight per million parts by weight of the medium. The exact dosage to be employed is dependent upon the plant mass to be treated and whether or not the exposure is carried out in a moving stream such as a canal or in standing water such as a pond. In standing water, good results are obtained when employing minimal dosages of the compound. In moving streams, somewhat higher concentrations are required in order to provide the contacting of the plant with a herbicidal amount of the hexachlorocyclopentadiene compound.

The method of the present invention may be carried out by distributing a growth inhibiting amount of hexachlorocyclopentadiene compound or a composition containing the compound in water adjacent to the growing plants. In such usage, the compound may be modified with one or more of a plurality of additaments or herbicide adjuvants, including water or inert organic solvents, surface active dispersing agents or finely divided solids. Preferred compositions of the present invention comprise emulsifiable liquid concentrates and wettable powder concentrates. Such concentrates are readily and conveniently adapted to be distributed in water adjacent to aquatic plants to provide in the water growth inhibiting concentrations of the toxicant.

The exact concentration of the pentadiene compound to be employed in compositions for the treatment of aquatic plant infested loci is not critical and may vary provided the required dosage of effective agent is supplied in the water adjacent to the plants. The concentration of toxicant in liquid and dust concentrates employed to supply the desired dosage is generally from about 10 to 95 percent by weight.

Liquid compositions containing the desired amount of the pentadiene compound may be prepared by dissolving the toxicant compound in an organic liquid such as alcohols, alkyl ethers of glycols and polyglycols, acetone, toluene, methylene chloride, chlorobenzene and petroleum distillates, or a mixture of one or more such liquids, or by dispersing the toxicant compound in water with the aid of a suitable surface active dispersing agent. The aqueous compositions may contain one or more water-immiscible solvents for the pentadiene compound. In such compositions the carrier comprises an aqueous emulsion, that is, a mixture of water-immiscible solvent, emulsifying agent and water. The compositions should be characterized by a density only slightly greater than water and should contain sufficient of the dispersing and emulsifying agent to make the composition self dispersing in water to give a milky dispersion which thereafter breaks to permit settling out of a solution of the pentadiene compound.

In the preparation of wettable powder compositions, the pentadiene compound is dispersed in and on a finely divided inert solid such as bentonite, fuller's earth, attapulgite and other clays. Such compositions may contain other finely divided solid carriers such as talc and chalk. In such operations the solid carrier is mechanically ground with the pentadiene compound and a surface-active dispersing agent.

The surface-active dispersing agents are generally employed in the amount of from 1 to 20 percent by weight of the combined weight of the agent and hexachlorocyclopentadiene compound in the composition. Dispersing and emulsifying agents which may be employed in the compositions include the condensation products of alkylene oxides with phenols and organic acids, alkyl aryl sulfonates, polyoxyalkylene derivatives of sorbitan esters, complex ether alcohols, mahogany soaps and the like.

The method of the present invention is carried out by dispersing a growth inhibiting amount of the pentadiene compound into the water adjacent to the submersed portions of the plants in a pond, lake, river, canal, stream, ditch, or other watercourse. This is readily accomplished by introducing the hexachlorocyclopentadiene compound or a composition containing the compound into water above a plant mass so as to permit its dispersion in the water adjacent the growing plant. The introduction of the toxicant into the water adjacent aquatic weeds conveniently may be accomplished by spraying or sprinkling the composition onto or beneath the surface of the water or by metering the composition into the vortex of a rapidly turning propeller to obtain maximum distribution of the compound in the water.

In moving water courses water flow may be employed to distribute the hexachlorocyclopentadiene compound. Thus the toxicant may be introduced into the water in such a manner that it is distributed into and over the plant growth area for a sufficient exposure time to kill the plants.

The following examples illustrates the invention but are not to be construed as limiting:

*Example 1*

In a representative operation, 0.4 part by weight of hexachlorocyclopentadiene, 10 parts of an acetone solution containing 0.1 percent by weight of a dimeric alkylated aryl polyether alcohol (Triton X–155) and 90 parts of water were mixed together to provide a liquid water dispersible concentrate. This concentrate was further diluted with water to prepare aqueous compositions containing 400, 200, 100, 50 and 25 parts by weight of toxicant per million parts of water. These compositions were employed for the treatment of *Cabomba caroliniana* (Cabomba), *Salvinia rotundifolia* (Salvinia), *Lysimastrum nummularia* (Moneywort) and Anacharis spp. (water weed), growing in a series of small tanks. In such operations, the aqueous compositions were poured into the tanks to expose the plants to concentrations of 400, 200, 100, 50 and 25 parts by weight of hexachlorocyclopentadiene per million parts of water. After one hour exposure the tanks were flushed and refilled with fresh water. Thereafter the water was changed daily by overflow filling. Other tanks containing the named species were left untreated to serve as checks.

At regular intervals observations were carried out to ascertain what control of growth had been obtained. Three weeks following the treating operations, the observations showed the controls of the growth of the named plant species as set forth in the following table.

| Parts by weight of hexachlorocyclopentadiene per million parts of water | Percent Kill of Named Plant Species at Indicated Concentration | | | |
|---|---|---|---|---|
| | Cabomba | Salvinia | Moneywort | Water weed |
| 400 | 100 | 100 | 100 | 100 |
| 200 | 100 | 100 | 100 | 100 |
| 100 | 100 | 100 | 100 | 100 |
| 50 | 100 | 100 | 100 | 100 |
| 25 | 100 | 100 | 95 | 100 |

At the time of observation, the untreated check tanks were found to support luxurious and succulent growth of the named plant species.

*Example 2*

Fifty parts by weight of hexachlorocyclopentadiene and 5 parts by weight of Triton X–155 are mixed and ground together to prepare a water dispersible concentrate composition.

Also an emulsifiable concentrate is prepared by mechanically mixing and grinding together 25 parts by weight of hexachlorocyclopentadiene, 10 parts by weight of Triton X–155 and 65 parts by weight of xylene.

In a similar manner, 25 parts by weight of hexachlorocyclopentadiene, 71 parts of fuller's earth, 2 parts of an alkyl aryl sulfonate (Nacconol NR) and 2 parts of a polymerized sodium salt of a substituted benzoid alkyl sulfonic acid (Daxad No. 27) are mechanically mixed and ground together to prepare a concentrate composition in the form of a wettable powder.

Also, a mixture of 20 parts by weight of hexachlorocyclopentadiene, 0.1 part of Nacconol NR, 0.1 part of Daxad No. 27 and 200 parts of water are ball milled together to prepare a water dispersible liquid concentrate composition.

These concentrate compositions or aqueous dispersions thereof in a small quantity of water are adapted to be employed to distribute growth inhibitive amounts of the pentadiene compound in water adjacent to growing aquatic weeds.

I claim:
1. A method for controlling the growth of aquatic plants which includes the step of introducing into water adjacent to the submersed portions of plants at least 15 parts per million to about 400 parts per million by weight of hexachlorocyclopentadiene.

2. A method for controlling the growth of aquatic plants which includes the step of introducing into the water adjacent to the submersed portions of the plants a composition comprising hexachlorocyclopentadiene as an active ingredient in intimate admixture with a herbicide adjuvant, said composition being employed in an amount sufficient to supply at least 15 parts per million to about 400 parts per million by weight of the hexachlorocyclopentadiene in the water.

References Cited in the file of this patent

UNITED STATES PATENTS 2,713,535 Patrick _____ July 19, 1955
2,789,044 Steinmetz _____ Apr. 16, 1957

OTHER REFERENCES

Di Prima in "Chemical Abstracts," vol. 44, column 8037(g).

Dybing et al. in "Weeds," vol. 3, No. 4, pp. 377 to 385, October 1954.

Oborn in "Weeds," vol. 3, No. 3, July 1954, pp. 231 to 240.